July 15, 1969  J. H. FLAHERTY  3,455,000

CUTTING TOOL AND TIP THEREFOR

Filed Oct. 25, 1966

INVENTOR.
James H. Flaherty
BY
Peter P. Kozak
ATTORNEY

United States Patent Office 3,455,000
Patented July 15, 1969

3,455,000
CUTTING TOOL AND TIP THEREFOR
James H. Flaherty, Hales Corners, Wis., assignor to General Motors Corporation, Detroit, Mich., a corporation of Delaware
Filed Oct. 25, 1966, Ser. No. 589,357
Int. Cl. B23b 27/14
U.S. Cl. 29—95                      1 Claim

ABSTRACT OF THE DISCLOSURE

A metal cutting tool having a beryllium oxide cutting tip portion is disclosed. The high thermal conductivity of the beryllium cutting tip portion enables the heat to be rapidly conducted away from the cutting edge thereby lowering the cutting edge operating temperature for a given work piece cutting speed as well as enabling said work piece to be used at a higher cutting speed for a given cutting edge operating temperature.

---

Figure 1:
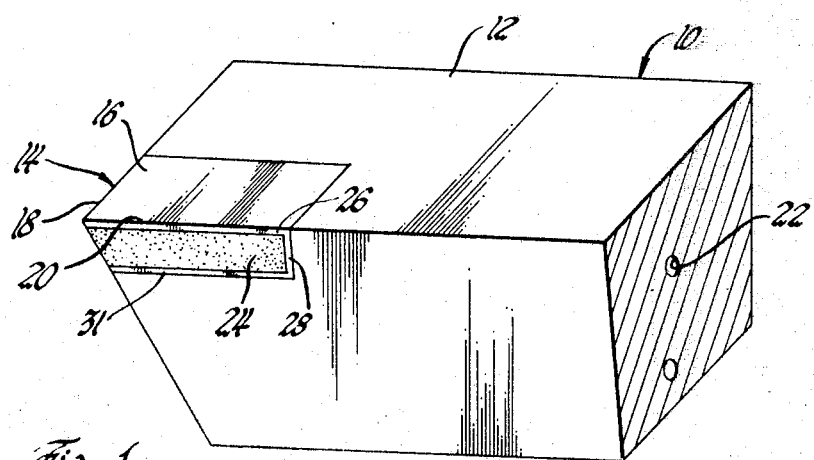

This invention relates to metal cutting tools, and more particularly to the cutting tip portion of the tool.

Metal cutting tools are widely used which have a tip portion thereof made from materials which have the ability to permanently retain a hardness sufficient for metal cutting at temperatures in excess of 1200° F. A well known example of a cutting tool tip material is a tungsten carbide. The life of this type of tip is directly related to the maximum temperature attained at the cutting edge of the tip. The higher the temperature is, the shorter the tip life. The temperature of the cutting edge is directly related to the speed of the workpiece, that is, the faster the workpiece turns or spins, the higher the temperature of the cutting edge. The trend to higher or faster cutting speeds in metal cutting operations has shortened the life of a cutting tip to the extent that the short life of the tip is a serious problem.

It is the primary object of this invention to provide a cutting tool which has a relatively long life. It is another object of this invention to provide a cutting tool tip which will have a lower cutting edge operating temperature for a given workpiece cutting speed. It is another object of this invention to provide a cutting tool tip which will enable a workpiece to be operated at a higher cutting speed for a given cutting edge operating temperature.

These and other objects are accomplished by the use of a cuting tool having a sintered beryllium oxide cuting tip portion. Three sides of the beryllium oxide cutting tip portion are metallized to provide a surface which can be bonded to the metal shank of the cutting tool. The sintered beryllium oxide tip rapidly conducts heat away from the cutting edge of the tip to the rest of the cuting tool. The rapid transfer of heat lowers the operating temperature of the cutting edge for a given cutting speed thereby extending the life of the tip. The rapid transfer of heat also permits the use of a higher workpiece cutting speed for a given cutting edge operating temperature.

Further objects and advantages of the present invention will be apparent from the following detailed description, reference being had to the drawings wherein a preferred embodiment of the present invention is clearly shown.

Figure 2:
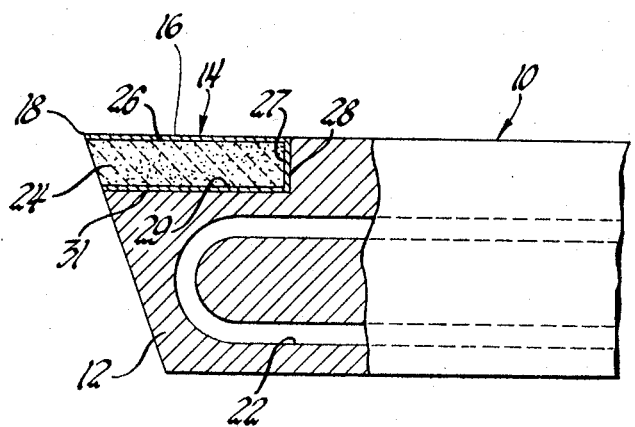

In the drawings:

FIGURE 1 is a perspective view of the cutting tool embodying the present invention; and FIGURE 2 is a view partially in cross section of the cutting tool.

Referring now to the drawings, FIGURE 1 is a perspective view of the cutting tool 10. The cutting tool 10 has a body or shank 12 of any conventional shape usually formed of steel or cast iron. Mounted on one side of the shank 12 and extending to the end thereof is a tip 14 which provides a generally flat cutting face 16 and is sharpened to provide end and side cutting edges 18 and 20 respectively. The tip 14 is seated in a squared recess formed in the shank 12 and is firmly bonded to the shank by means which will hereinafter be fully described. Positioned within the shank 12 is a cooling passage 22. The cooling passage 22 which is formed by conventional methods is positioned in the central part of the shank 12 as shown in FIGURE 2. The cooling passage 22 can be positioned so that it passes through or close to the cutting tool tip 14. Any of the conventional cooling fluids such as water, methyl alcohol-Dry Ice mixtures, are passed through the cooling passage. The cutting tool 10 may be cooled by a stream of air if desired.

In accordance with the present invention, the tip 14 is formed of a relatively thick body 24 of sintered beryllium oxide. The sintered beryllium oxide body is formed by conventional methods which includes molding commercially available beryllium oxide powder into the desired cutting tool tip shape and then sintering the body at an elevated temperature. The molding and sintering can be carried out in a single hot pressing operation if desired. The cutting edge 18 or 20 portion of the sintered beryllium oxide tip is the hottest during the cutting operation. The high thermal conductivity of the beryllium oxide 24 enables the beryllium oxide to transmit the heat away from the cutting edge 18 or 20 portion to the cutting tool shank 12 much faster than prior art tool tip materials. The thermal conductivity of beryllium oxide is 190 B.t.u./ hr./ft./° F., whereas the thermal conductivity values of tungsten carbide and iron are 17 and 40 respectively. By conducting the heat away from the cutting edge at a faster rate than prior art cutting tool tip materials, the cutting edge does not become heated to as high a temperature as in prior art cutting tips. Since the high temperatures obtained at the cutting edge cause the cutting tool to have a short life, the use of beryllium oxide increases the length of the cutting tool life because the temperature of the beryllium oxide cutting edge is lower than the cutting edge of the prior art materials for a given cutting speed. The high thermal conductivity of beryllium oxide also enables the workpiece to be used at a higher or faster cutting speed than with prior art materials for a given cutting edge temperature. Beryllium oxide has a high compressive strength and a lower coefficient of expansion. It is essential that a metal cutting edge having a high strength in order to cut into metals. The low coefficient of expansion is a desirable property because the cutting tool edge will hold tolerances better over a wide temperature range. The low coefficient of expansion also enables the beryllium oxide tip to have excellent thermal shank characteristics.

In a preferred embodiment of the present invention as shown in FIGURE 2, the beryllium oxide body 24 is provided with a relatively thin layer 26 of chromium which provides a lower friction surface for the flat cutting face 16. The chromium layer 26 has a thickness of about 0.0003 to 0.0004 inch. The low coefficient of friction of chromium provides a surface on which the chip that is removed by cutting can easily move thereon. Since the chromium layer 26 is relatively thin, it does not impede the flow of heat generated at the cutting edge. The thin chromium layer may be formed by the use of conventional plasma flame spray or vapor plating techniques.

The sides of the beryllium oxide body 24 which are to be fastened to the steel shank 12 as for example the sides 27 and 29 shown in FIGURE 2, are first coated with a thin metal layer 28 and 31 respectively, of a high temperature metal such as steel, nickel, brass, and the like, which in turn is bonded to the shank 12 whereby the beryllium oxide body is bonded to the shank. The thin layers 28 and 31 are applied by a plasma spray or by a vapor plating technique to the beryllium oxide. These layers should have a melting point high enough so that it can withstand the temperatures encountered during the cutting operation. The metal layers 28 and 31 are bonded to the shank 12 by silver solder or suitable bonding means. It will be understood of course that all three sides of the beryllium oxide body which are fastened to the shank 12 have a metal layer bonded thereto.

Wherein the invention has been described in terms of a preferred embodiment, it is to be understood that it is not limited thereby except as defined in the following claim.

I claim:
1. A metal cutting tool adapted to engage a spinning workpiece comprising a shank portion of ferrous material forming a seat for a cutting tip, a cutting tip portion bonded to said shank portion on said seat, said tip portion defining a cutting face and cutting edges, and a thin layer of chromium bonded to the surface of said cutting face, said tip portion being a sintered beryllium oxide body wherein said beryllium oxide body rapidly conducts heat away from said cutting edge thereby lowering the cutting edge operating temperature for a given workpiece cutting speed as well as enabling said workpiece to be used at a higher cutting speed for a given cutting edge operating temperature.

References Cited

UNITED STATES PATENTS

| | | | |
|---|---|---|---|
| 2,044,853 | 6/1936 | Laise | 29—95 |
| 2,251,007 | 7/1941 | Schroter | 29—95 |
| 2,256,847 | 9/1941 | Osenberg | 29—95 |
| 2,902,756 | 9/1959 | Cavanaugh | 29—473.1 |
| 2,979,414 | 4/1961 | Ryshkewitch | 106—44 |
| 3,067,048 | 12/1962 | Gion | 106—55 |
| 3,226,456 | 12/1965 | Ryshkewitch | 264—.5 |
| 3,284,176 | 11/1966 | Reed | 29—473.1 X |
| 3,316,628 | 5/1967 | Lang | 29—473.1 X |

OTHER REFERENCES

Article: How To Chromium-Plate for Greater Tool Life, by R. W. Bennet, and C. Hastie, from Machinery magazine of March 1944, pp. 190–194.

HARRISON L. HINSON, Primary Examiner.

UNITED STATES PATENT OFFICE
CERTIFICATE OF CORRECTION

Patent No. 3,455,000                                          July 15, 1969

James H. Flaherty

It is certified that error appears in the above identified patent and that said Letters Patent are hereby corrected as shown below:

Column 1, lines 48 and 53, "cuting tool", each occurrence, should read -- cutting tool --; line 48, "cuting tip" should read -- cutting tip --. Column 2, lines 46 and 57, "lower", each occurrence, should read -- low --; line 47, "having" should read -- have --.

Signed and sealed this 9th day of June 1970.

(SEAL)
Attest:

Edward M. Fletcher, Jr.                          WILLIAM E. SCHUYLER, JR.
Attesting Officer                                      Commissioner of Patents